United States Patent
Rhodes et al.

(10) Patent No.: US 7,638,739 B2
(45) Date of Patent: Dec. 29, 2009

(54) THERMOSTAT HAVING A DISCARDABLE PROTECTIVE COVER

(75) Inventors: William D. Rhodes, Red Bud, IL (US); Bartholomew L. Toth, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 650 days.

(21) Appl. No.: 11/304,928

(22) Filed: Dec. 15, 2005

(65) Prior Publication Data

US 2007/0140314 A1 Jun. 21, 2007

(51) Int. Cl.
*H05B 1/02* (2006.01)
(52) U.S. Cl. .................... 219/481; 219/494; 219/492; 219/506; 236/1 R; 337/380
(58) Field of Classification Search ................ 219/481, 219/490, 491, 494, 497, 499, 501, 505, 507; 236/1 R, DIG. 19; 337/327, 380
See application file for complete search history.

(56) References Cited

U.S. PATENT DOCUMENTS

| 4,501,936 | A | | 2/1985 | Morse | 179/184 |
| 4,901,852 | A | | 2/1990 | King | 206/320 |
| 5,381,950 | A | * | 1/1995 | Aldridge | 236/1 R |
| 2002/0147037 | A1 | | 10/2002 | Kwon | |
| 2004/0082362 | A1 | | 4/2004 | Peng et al. | |
| 2006/0124482 | A1 | * | 6/2006 | Hodges | 206/320 |
| 2006/0227031 | A1 | * | 10/2006 | Benbow | 341/176 |
| 2008/0190528 | A1 | * | 8/2008 | Steinberg | 150/165 |

FOREIGN PATENT DOCUMENTS

| GB | 2 328 766 | | 3/1999 |
| WO | WO 01-69805 | A1 | 9/2001 |

* cited by examiner

*Primary Examiner*—Mark H Paschall
(74) *Attorney, Agent, or Firm*—Harness, Dickey & Pierce, P.L.C.

(57) ABSTRACT

A removable cover is provided that includes a flexible elastic material forming a cover front portion and a plurality of edge portions. The plurality of edge portions are configured to be stretched over at least a portion of two or more sides of a thermostat, such that the cover may be secured onto a thermostat via the tension of the edge portions stretched over the thermostat. The cover is adapted to be placed onto the thermostat to provide protection for at least the front surface of a thermostat.

13 Claims, 5 Drawing Sheets

THERMOSTAT HAVING A DISCARDABLE PROTECTIVE COVER

FIELD OF THE INVENTION

The present invention relates to thermostats for heating and cooling systems, and installation of thermostats in residential and commercial buildings.

BACKGROUND OF THE INVENTION

The statements in this section merely provide background information related to the present disclosure and may not constitute prior art.

In the construction of new residential and commercial buildings, it is advantageous to use the building's HVAC system during the construction process to maintain temperature for workers, as well as to dry out joint compound or paint. However, a new thermostat that is installed before construction is complete could be damaged or stained, and would subsequently need to be replaced by the contractor. For this reason, contractors are wary to install a new thermostat during the construction process, since the thermostat may not be durable enough to be exposed to paint and other construction conditions without resulting in irreparable damage.

SUMMARY OF THE INVENTION

According to one aspect of the present invention, a cover is provided that comprises a flexible material which permits the cover to be fit onto a thermostat to protect the thermostat. In one embodiment, the cover comprises a flexible elastic material forming a cover front portion and a plurality of edge portions. The plurality of edge portions are configured to be stretched over at least a portion of two or more sides of a thermostat, such that the cover may be secured onto a thermostat by the tension of the edge portions when stretched over the sides of the thermostat. The cover is adapted to be placed onto the thermostat to cover at least the front surface of a thermostat.

In another aspect of the present invention, a cover in combination with a thermostat is disclosed that provides a thermostat with a removable protective cover for protecting the thermostat from contaminants. The combination comprises a thermostat having a front surface with at least one operating means and at least one display means, and the protective cover. The cover comprises a flexible elastic material forming a front cover portion and a plurality of edge portions that define a space that is smaller than the thermostat. The edge portions of the cover are configured to be stretched over at least a portion of the sides of the thermostat, such that the cover is secured to the thermostat by the tension of the edge portions when stretched over the thermostat. The cover edge portions snugly conform to the contour of the thermostat, whereby the cover protects the thermostat from contaminants. The front portion of the cover permits movement of the operating means of the thermostat through the cover, to permit proper operation of the thermostat by a user.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings described herein are for illustration purposes only and are not intended to limit the scope of the present disclosure in any way. The present invention will become more fully understood from the detailed description and the accompanying drawings, wherein.

Corresponding reference numerals indicate corresponding parts throughout the drawings.

DETAILED DESCRIPTION

The following description of the preferred embodiment(s) is merely exemplary in nature and is in no way intended to limit the present disclosure, application, or uses. The various embodiments of a cover provide for covering a thermostat with a flexible material that conforms to the contour of the thermostat to protect the thermostat from contamination or damage that may occur from inadvertent contact by construction workers.

When a new heating or cooling system is used during new construction of residential or commercial buildings, the conditions in which a thermostat is exposed to in such situations is less than ideal. The thermostat may fall prey to dust resulting from framing construction, insulation, dry wall sanding, or paint. The thermostat may be exposed to more hostile conditions of a new construction environment, and may be scratched or marred by construction workers passing near the thermostat. In falling prey to one of these evils, the newly installed thermostat will be left looking anything but new.

Figure 1:
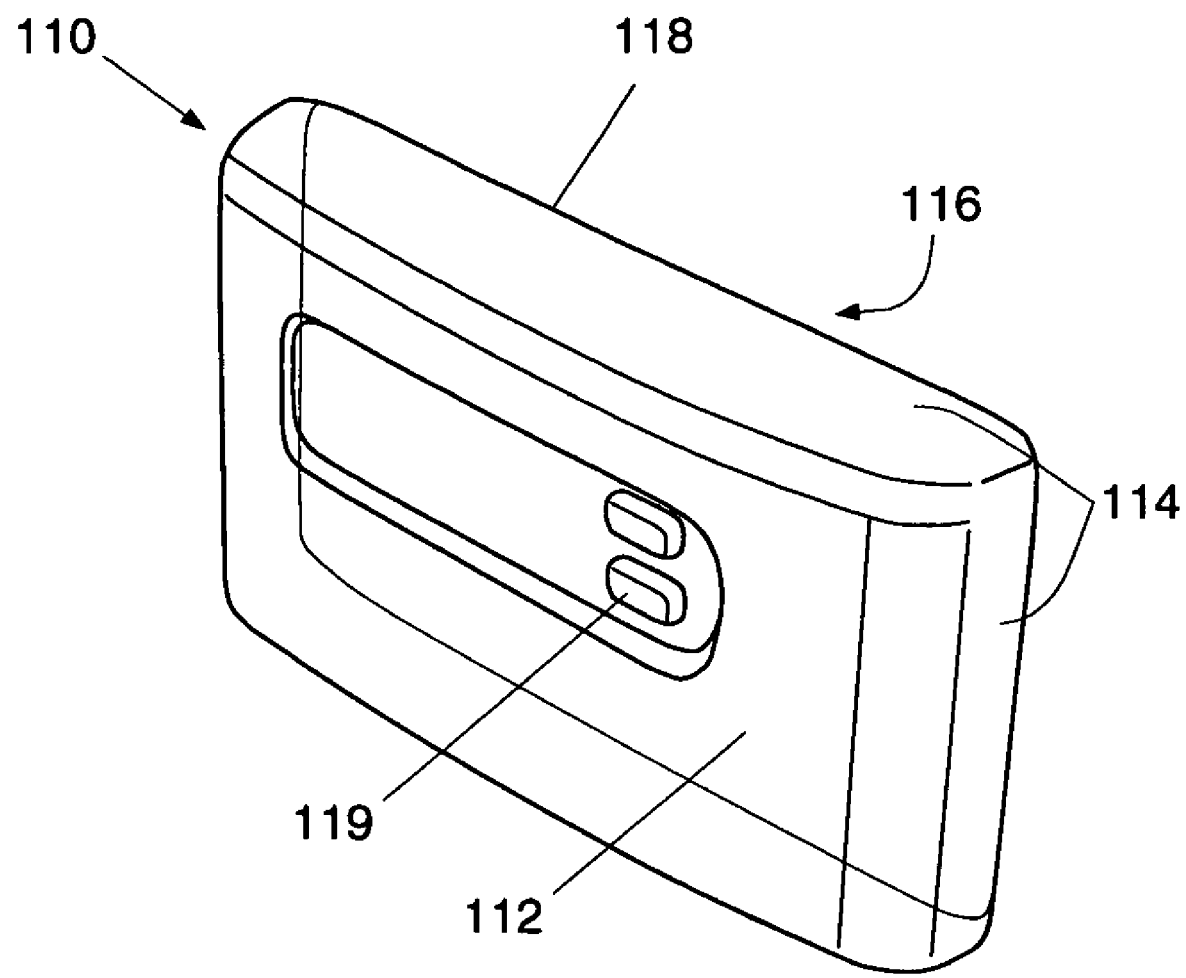
FIG. 1 is a perspective view of one embodiment of a protective cover for a thermostat according to the present invention.
Figure 2:
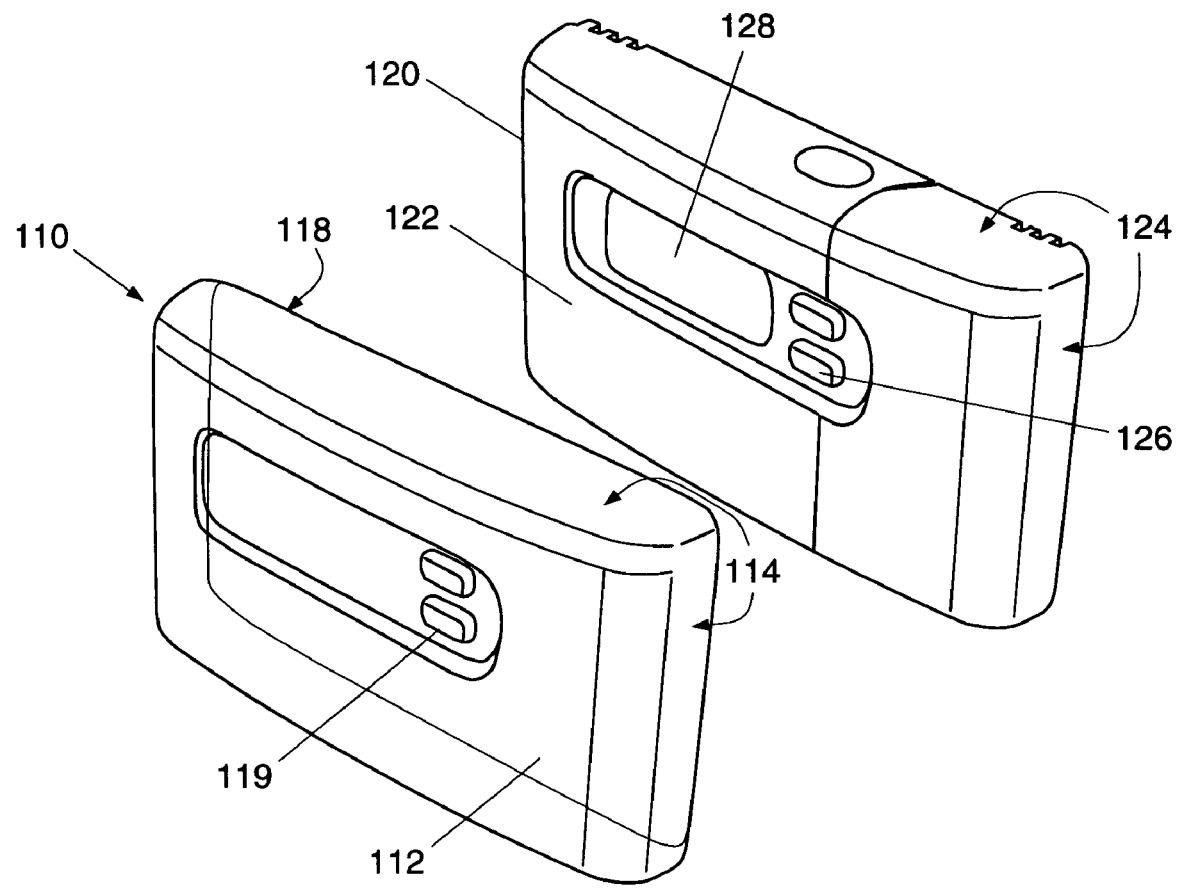
FIG. 2 is a perspective exploded view of one embodiment of a protective cover and a thermostat according to the present invention.

In one embodiment according to the principles of the present invention, a cover 110 is formed of a flexible material to provide a removable protective cover 110 for a thermostat 120. Referring to FIG. 1, a protective cover 110 for a thermostat 120 is shown. The cover 110 may be made of various sizes and shapes to compliment any variety of thermostat contours and designs. In any case, the cover 110 is constructed of a thin, flexible elastic material, such as but not limited to, plastic or rubber. A preferred material is latex or silicone rubber, but any resilient flexible material suitable for being stretched over an object may be used.

The first embodiment of a cover 110 generally comprises a flexible elastic material forming a cover front portion 112 and a plurality of edge portions 114. The plurality of edge portions 114 are configured to be stretched over at least a portion of the sides 124 of a thermostat 120, such that the cover 110 may be secured to a thermostat 120 by the tension of the edge portions 114 when stretched over the sides 124 of the thermostat 120. The cover 110 is adapted to protect the front surface 122 of a thermostat 120 from contaminants such as paint or grease, which construction workers may inadvertently impart on the buttons 126 when operating the thermostat.

The protective cover 110 substantially surrounds the thermostat 120, and is preferably constructed from a transparent, stretchable or resilient plastic. One example of such a resilient material is a high-strength silicon, sold by Dow Corning Inc., which is significantly resilient and tear resistant. The material used to construct the cover 110 may come in any variety of colors, or may even be transparent. Similarly, the cover 110 may be imprinted with various indicia such as the logo or name of the manufacturer or distributor of the thermostat 120.

The protective cover 110 comprises a front portion 112 and a plurality of edge portions 114 that form an opening 116 in the back of the cover for insertion of a thermostat 120 therein. The edge portions 114 define an opening 116 that is adapted to receive at least a portion of the sides 124 of a thermostat 120. In some cover embodiments, the cover 110 has smaller opening dimension than the thermostat 120 it is intended to cover, to allow the cover 110 to be stretched tautly across the thermostat 120. Some embodiments of a cover 110 may be formed with edges 118 along the opening 116 that extend inwardly towards the center of the cover to help the cover 110 adhere to the thermostat 120. The edge portions 114 are configured to engage the sides of the thermostat 120, and may include an outer edge 118 adjacent the opening that is of a greater thickness than the rest of the cover 110. In general, the cover 110 is approximately 0.030 inches thick, while the near edge portions 118 adjacent the opening 116 may have a greater thickness up to 0.100 inches to provide support.

In one aspect of the invention, an embodiment of a cover 110 in combination with a thermostat 120 is provided that protects the thermostat 120 from contaminants or materials that the thermostat 120 may be exposed to, such as paint. The combination comprises a thermostat 120 having a front surface 122 with at least one operating means 126 and at least one display means 128, and the protective cover 110. The cover 110 comprises a flexible elastic material forming a front cover portion 112 and a plurality of edge portions that define a space that is smaller than the thermostat 120. The edge portions of the cover 110 are configured to be stretched over at least a portion of the sides of the thermostat 120, such that the cover 110 is secured to the thermostat 120 by the tension of the edge portions when stretched over the thermostat 120. The cover edge portions snugly conform to the contour of the thermostat 120, whereby the cover 110 protects the thermostat 120 from contaminants. The front portion of the cover 110 may further comprise raised portions 119 for receiving or covering a portion of a button or operating means of the thermostat therein. Alternatively, raised portions may not be used where the front cover conforms to the button or operating means without activating such means. The front portion 112 of the cover 110 permits movement of the operating means of the thermostat 120 through the cover 110, to permit proper operation of the thermostat 120 by a user.

It is important to note that the edge portions of the cover 110 engage the sides of the thermostat 120, and do not reach any part of the back side of the thermostat 120, where the cover 110 might hinder air flow to the thermostat's temperature sensing means (not shown). The cover's resilient material and the taught fit of the cover's edge portions 114 over the thermostat 120 insure the shape-hugging feature of the cover 110. One or more raised portions in the cover correspond to one or more user input buttons on the thermostat. The resilient nature of the cover 110 also allows for activation of the thermostat 120 buttons through the cover 110. Likewise, at least a portion of the cover 110 is transparent or translucent to allow the user of the thermostat 120 to view the thermostat's display device 128 through the front portion 112 of the cover 110. Other portions of the cover not covering the thermostat's display means may be any variety of color, or may further be imprinted with various indicia.

It is essential that the cover 110 not distort or interfere with the operating means of the thermostat 120, because any loss in movement of the buttons or operating means of the thermostat 120 would impair proper operation of the thermostat 120 by the user. Thus, the edge portions fit snuggly over the sides of the thermostat 120, while the front portion 112 of the cover 110 conforms to the front surface 122 of the thermostat 120. This allows the front portion 112 of the cover 110 to remain flexible to permit a user to operate the thermostat's buttons or operating means 126 through the front portion 112 of the cover 110, thereby ensuring proper thermostat 120 operation by a user of the thermostat.

An advantage of the cover 110 is that it may be removed from a newly installed thermostat 120 upon completion of construction or painting, and thus preserves the thermostat's appearance and new finish. The cover 110 may be removable to allow the user to access a door of the thermostat, after which the cover 110 may subsequently be replaced onto the thermostat 120. The cover 110 could also be left on and could include an advertising logo on its surface, such as the name of an HVAC contractor. The cover 110 can also provide for use as a novelty item, in that it can be changed depending on the season. For example, the cover 110 for the thermostat 120 may be changed or replaced with another cover 110 having decorative indicia corresponding to a Christmas or Halloween holiday.

Figure 3:
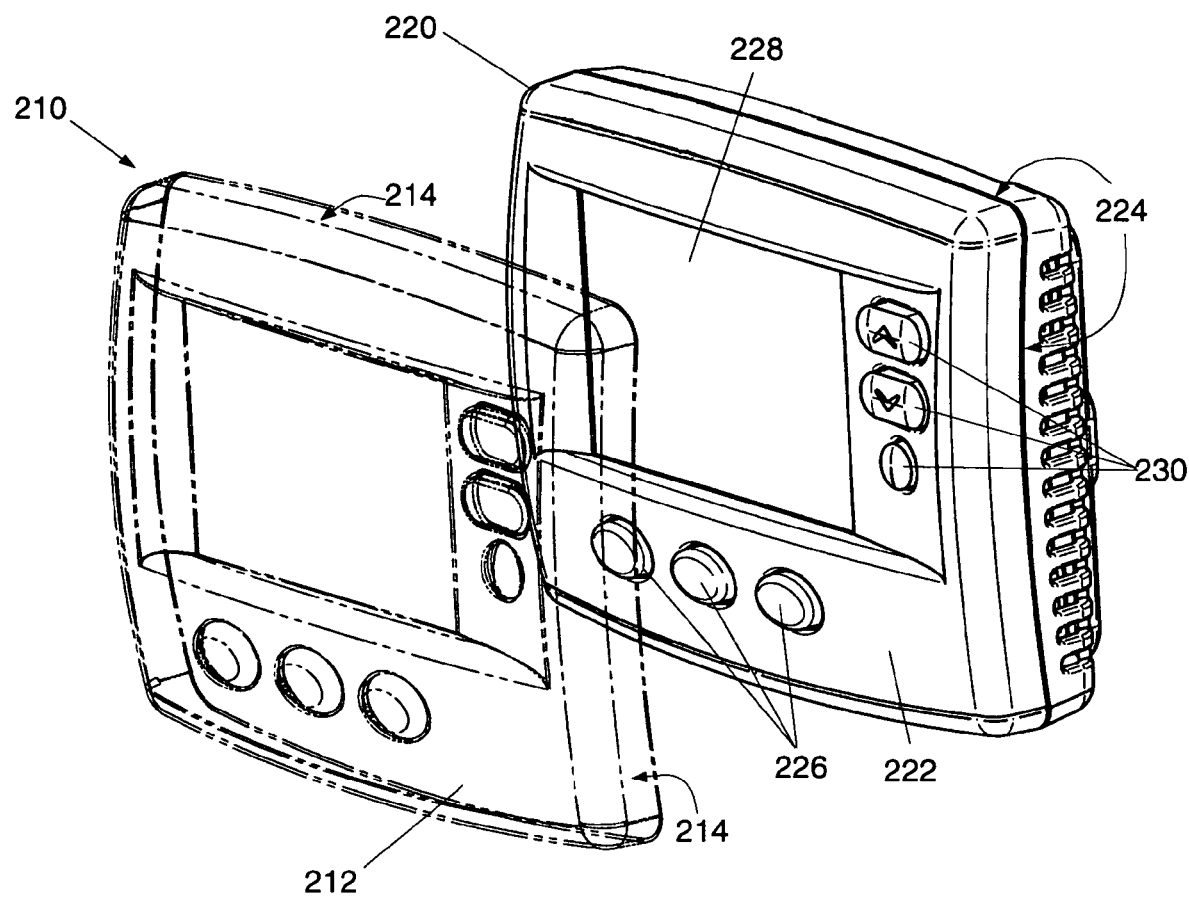
FIG. 3 is a perspective exploded view of a second embodiment of a protective cover and a thermostat.

It should be noted that various embodiments of a cover may have different sizes and shapes to compliment a variety of thermostat contours and designs. For example, in a second embodiment, a cover 210 is tailored to fit closely over a specific thermostat model 220 as shown in FIG. 3. The thermostat 220 is preferably an 80 series 1 F80-0471 thermostat manufactured and sold by White-Rodgers, a division of Emerson Electric, Co. The cover 220 has side portions 214 that are configured to fit over the sides 224 of the thermostat 220. The side portions 214 may further include one or more catches (not shown) for engaging a grooved side of the thermostat 224. The thermostat 220 has a front surface 222 that is about 4.5 inches wide by 3.4 inches high. The front surface 222 includes three buttons 226 below a display device 228, and three buttons 230 to the right of the display device 228. The display device 228 has a width of about 2.5 inches and a height of about 1.7 inches. In other models of the 1F80 thermostat, the thermostat may have only three buttons 230 to the right of the display device 228. Thus, an alternate construction of the cover 210 would comprise only three raised portions to correspond to the three buttons 230. Accordingly, various embodiments of a cover may be made to accommodate different respective thermostat models.

Figure 4:
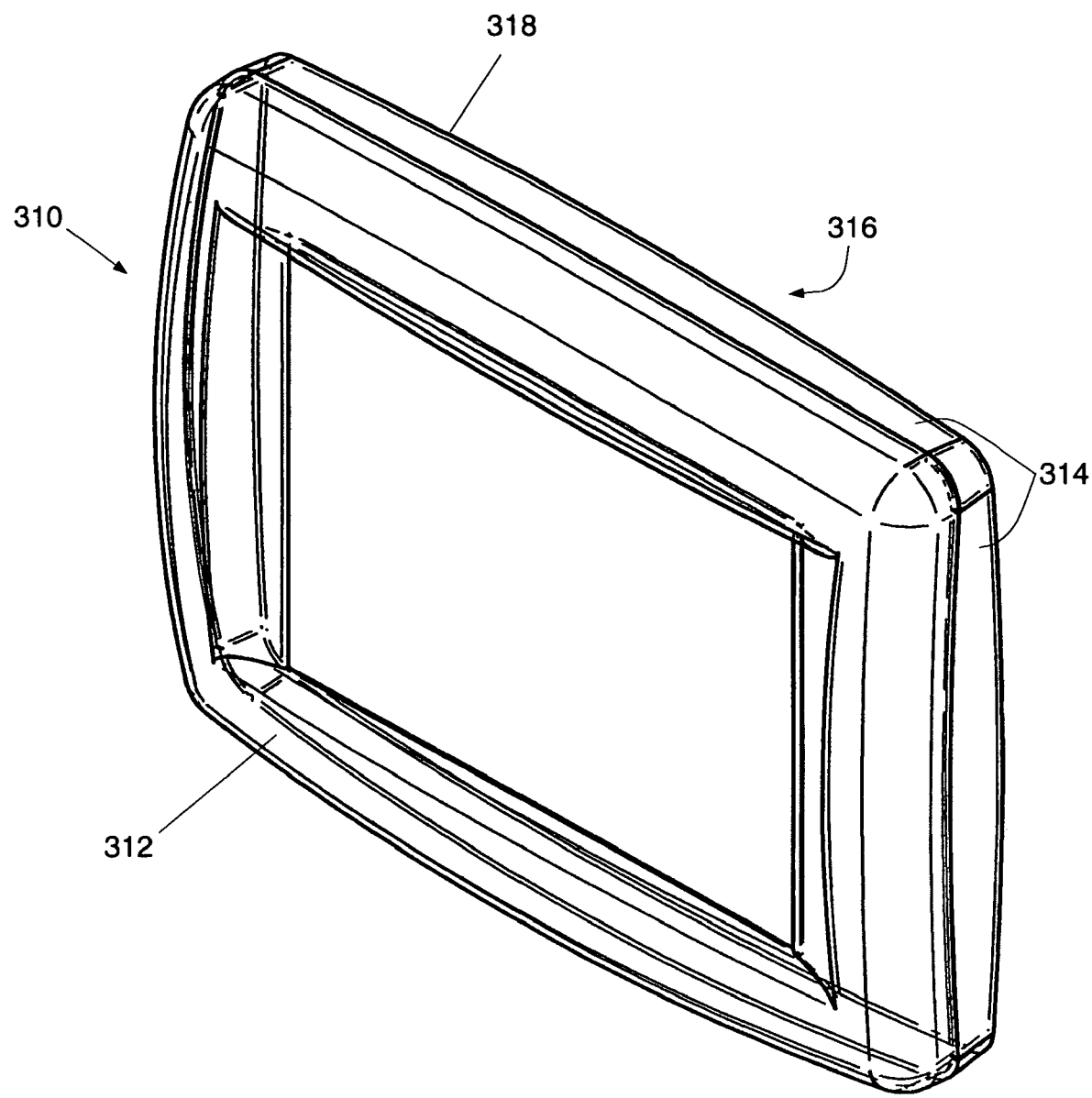
FIG. 4 is a perspective view of a third embodiment of a protective cover for a thermostat.
Figure 5:
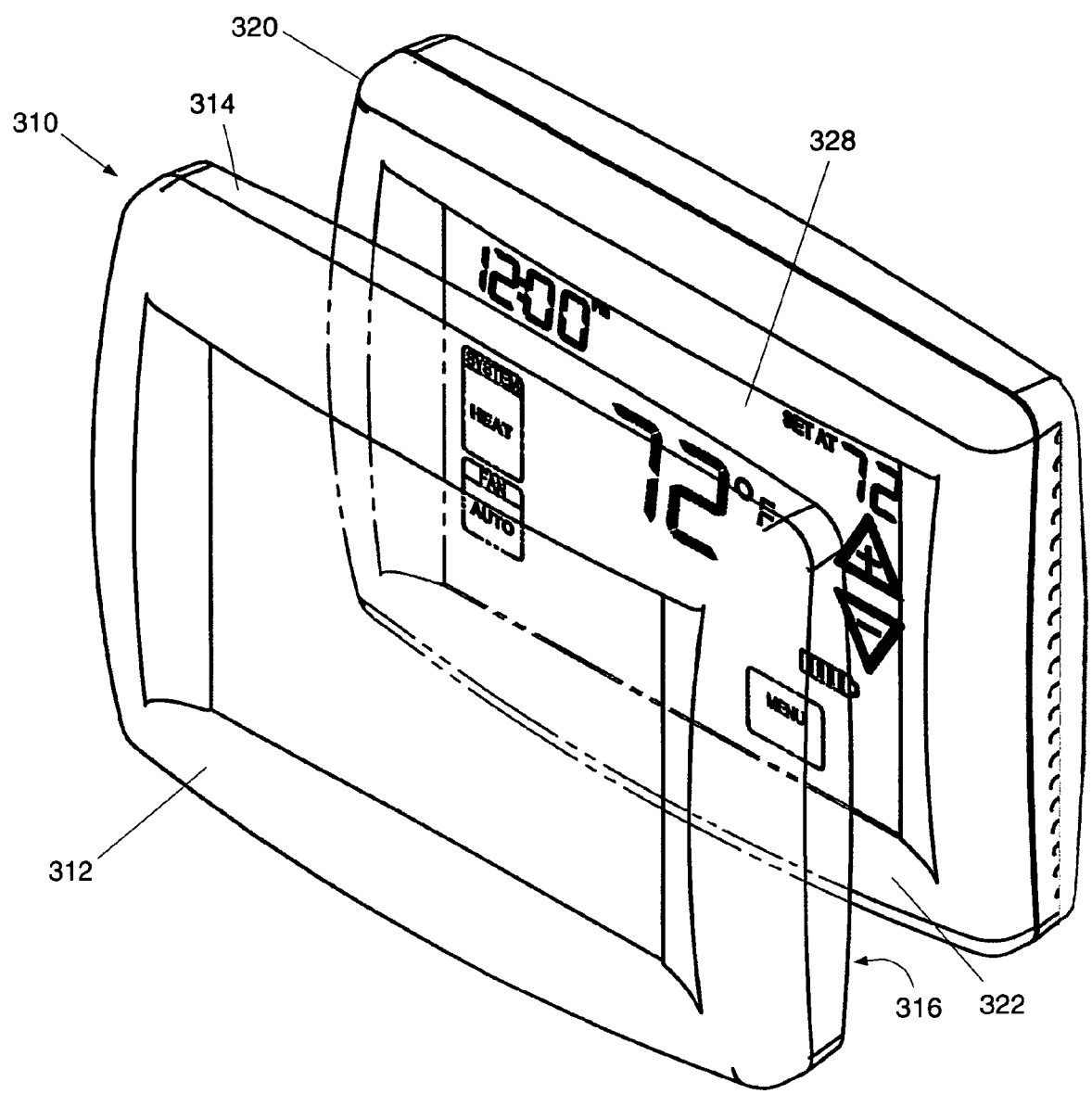
FIG. 5 is a perspective exploded view of a thermostat and the protective cover in FIG. 4.

In another thermostat example, a third embodiment of a cover 310 is tailored to fit closely over a touch screen thermostat The cover 310 has side portions 314 that are configured to fit over the sides of a thermostat, and a front surface 322 that is configured to fit over a touch screen display on a thermostat. The material of the front surface 320 is sufficiently flexible to permit a user to operate the thermostat input means through the front surface 322. The cover 310 may be used with a thermostat model 320 as shown in FIG. 4. The thermostat 320 is preferably a 90 Series 1F90-1271 thermostat manufactured and sold by White-Rodgers, a division of Emerson Electric, Co. The thermostat 320 has a width of about 5.9 inches and a height of about 4.6 inches. The touch screen includes a display device 328 with a width of about 4 inches and a height of about 3 inches. The resilient nature of the cover 310 also allows for activation of the thermostat's touch screen 328 through the cover 310. Likewise, at least a portion of the front surface 322 is transparent or translucent to allow the user of the thermostat 320 to view the display 328. Accordingly, some embodiments of a cover do not include raised portions for any buttons, and may be configured to have a transparent area on the front surface 322 configured to align with and fit against a touch screen display 328, through which the user may control the thermostat.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In combination with a thermostat having a front surface with at least one operating means, the cover comprising: a flexible elastic material forming a front cover portion a plurality of edge portions that define an opening that is smaller than the thermostat, and an outer edge along the opening that extends inwardly towards the center of the cover, wherein the edge portions are configured to be stretched to cover at least a portion of the sides of the thermostat, and the outer edge of the cover an outer edge along the opening that extends inwardly towards the center of the cover is configured to engage the edges of the sides of the thermostat such that the cover is secured to the thermostat by the outer edge engaging the sides of the thermostat and by the tension of the edge portions when stretched to cover the thermostat and snugly conform to the contour of the thermostat, whereby the thermostat is protected from contaminants when the cover engages the thermostat, while still being allowed to operate normally.

2. The combination of claim 1 wherein the front portion of the cover permits movement of the operating means of the thermostat through the cover to allow for proper operation of the thermostat by a user.

3. The combination of claim 1 wherein the edge portions fit tautly over the sides of the thermostat while the front portion of the cover conforms to the front surface of the thermostat, such that the front portion of the cover is sufficiently flexible to permit movement of the thermostat's operating means through the front portion to ensure that the user may operate the thermostat.

4. The combination of claim 3 wherein the cover is removably secured to the thermostat, such that after removal the cover may subsequently be replaced onto the thermostat.

5. The combination of claim 3 wherein at least a section of the outer edge near the opening in the cover is of a greater thickness than the rest of the cover.

6. In combination with a thermostat having a front surface with at least one operating means and at least one display means, the cover comprising: a flexible elastic material forming a front cover portion, a plurality of edge portions that define an opening that is smaller than the thermostat, and an outer edge along the opening that extends inwardly towards the center of the cover, wherein the edge portions are configured to be stretched to cover at least a portion of the sides of the thermostat, and the outer edge of the cover is configured to engage the edges of the sides of the thermostat, such that the cover is secured to the thermostat by the outer edge engaging the sides of the thermostat and by the tension of the edge portions when stretched to cover the thermostat and snugly conform to the contour of the thermostat, whereby the cover protects the thermostat from contaminants when the cover engages the thermostat, and permits movement of the operating means of the thermostat through the cover to permit proper operation of the thermostat by a user.

7. The combination of claim 6 wherein the front portion of the cover permits movement of the operating means of the thermostat through the cover to allow for proper operation of the thermostat by a user.

8. The combination of claim 6 wherein the edge portions fit tautly over the sides of the thermostat while the front portion of the cover conforms to the front surface of the thermostat, such that the front portion of the cover is sufficiently flexible to permit movement of the thermostats operating means through the front portion to ensure that the user may operate the thermostat.

9. The combination of claim 8 wherein the cover is removably secured to the thermostat, such that after removal the cover may subsequently be replaced onto the thermostat.

10. The combination of claim 8 wherein at least a section of the outer edge near the opening in the cover is of a greater thickness than the rest of the cover.

11. The combination of claim 6 wherein at least a portion of the cover is transparent in the area of the cover that is over the thermostat's display means, to allow the user to view the thermostat's display means.

12. The combination of claim 6 wherein the edge portions of the cover do not extend beyond the sides of the thermostat, and do not hinder air flow to the thermostat's temperature sensing means.

13. The combination of claim 11 wherein the cover is made from a material that is one of the group consisting of latex, silicon, silicon rubber, or plastic.

\* \* \* \* \*

UNITED STATES PATENT AND TRADEMARK OFFICE
CERTIFICATE OF CORRECTION

| | | |
|---|---|---|
| PATENT NO. | : 7,638,739 B2 | Page 1 of 1 |
| APPLICATION NO. | : 11/304928 | |
| DATED | : December 29, 2009 | |
| INVENTOR(S) | : Rhodes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Ninth Day of November, 2010

David J. Kappos
*Director of the United States Patent and Trademark Office*